G. C. DAVISON.
GYROSCOPIC STEERING MECHANISM FOR TORPEDOES.
APPLICATION FILED NOV. 21, 1910.

1,033,995.

Patented July 30, 1912.
5 SHEETS—SHEET 4.

WITNESSES:
Leon N. Rosenthal
A. L. Kearney

INVENTOR
Gregory C. Davison
BY
Pennie & Goldsborough
ATTORNEYS

UNITED STATES PATENT OFFICE.

GREGORY CALDWELL DAVISON, OF QUINCY, MASSACHUSETTS.

GYROSCOPIC STEERING MECHANISM FOR TORPEDOES.

1,033,995. Specification of Letters Patent. Patented July 30, 1912.

Application filed November 21, 1910. Serial No. 593,480.

*To all whom it may concern:*

Be it known that I, GREGORY C. DAVISON, a citizen of the United States, residing at Quincy, county of Norfolk, State of Massachusetts, and having a post-office address care of Electric Boat Company, Quincy, Massachusetts, have invented certain new and useful Improvements in Gyroscopic Steering Mechanism for Torpedoes; and I do hereby declare the following to be a full, clear, and exact description of the invention, such as will enable others skilled in the art to which it appertains to make and use the same.

It is customary to provide automobile or self-propelled torpedoes with automatic steering mechanism controlled by a gyroscope and adapted to keep the torpedo on a predetermined course, and in such torpedoes it is necessary to spin the rotating body or fly-wheel of the gyroscope up to a high speed of rotation during the period of ejection of the torpedo from the torpedo firing tube. The time available for the purpose varies from about a quarter of a second to about half a second, depending somewhat upon the character and efficiency of the firing mechanism. It has been customary to impart this rotation to the fly-wheel body of the gyroscope by mechanical means driven from the main shaft of the torpedo, but this has the disadvantage that the main shaft itself must be speeded up before the fly-wheel can in turn be spun by the shaft. It has also been proposed to spin the fly-wheel by the release of a previously wound up spring, but this has the disadvantage that it is not entirely reliable and requires the employment of a large spring which occupies considerable space. It has further been proposed to employ a gyroscope driven by the compressed air which is always carried in the torpedo for the purpose of propelling it, through the medium of a turbine which forms part of the rotating gyroscope body; and the object of the present invention is to improve and make practicable the construction and mode of operation of such turbine driven gyroscopes. In order that a gyroscope employed for the intended purpose may be properly spun by any impelling force whatever, it is necessary to provide means for holding in a fixed position the supporting gimbal-rings of the fly-wheel, together with mechanism for releasing the gimbal-rings after the fly-wheel has been speeded up, and an improved retaining and releasing mechanism for this purpose forms part of the present invention. It is customary to provide a servo-motor controlling the vertical rudder of the torpedo and itself controlled by the relative movement of the body of the torpedo with respect to the gyroscope, and this involves mechanism for imparting such relative movement to a control valve of the servo-motor; and as an incident to the present invention there is provided an improved valve and valve actuating mechanism for this purpose.

The exact nature of the invention will best be understood by reference to the accompanying drawings and the following description which illustrates and describes the invention in its preferred embodiment.

In the drawings Figs. 8 to 14 inclusive are detail views of the control valve for the servo-motor, Fig. 8 being a section on the line 8—8 of Fig. 9; Fig. 10 an elevation of the valve plug; and Figs. 11, 12, 13 and 14, sections on the lines 11—11, 12—12, 13—13 and 14—14 of Fig. 8.

Figure 6:
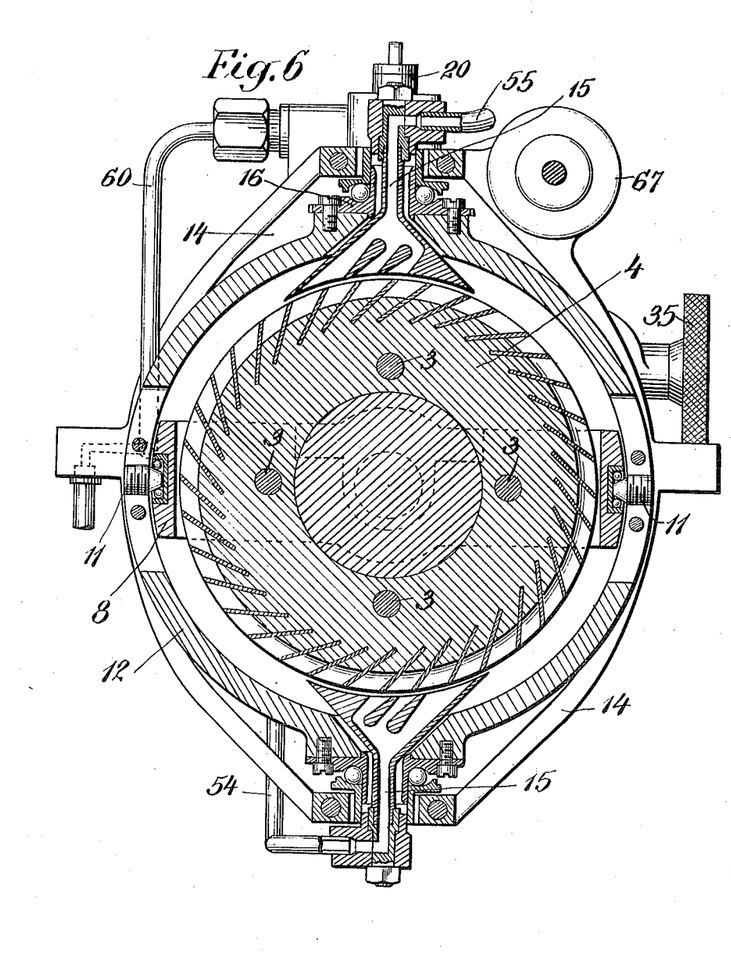
Fig. 6 is a vertical section on line 6—6 of Figs. 1 and 3.
Figure 7:
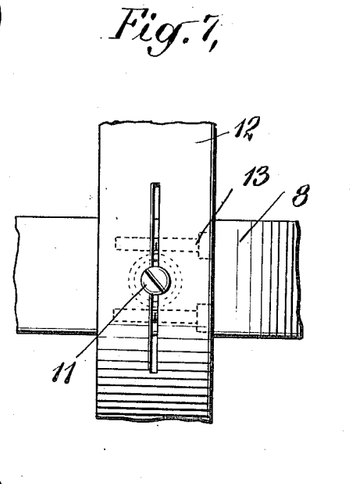
Fig. 7 is a detail view showing the manner in which the pivot points of the inner gimbal-ring are supported in the outer gimbal-ring.
Figures 8, 10, 11, 12, 13, 14:
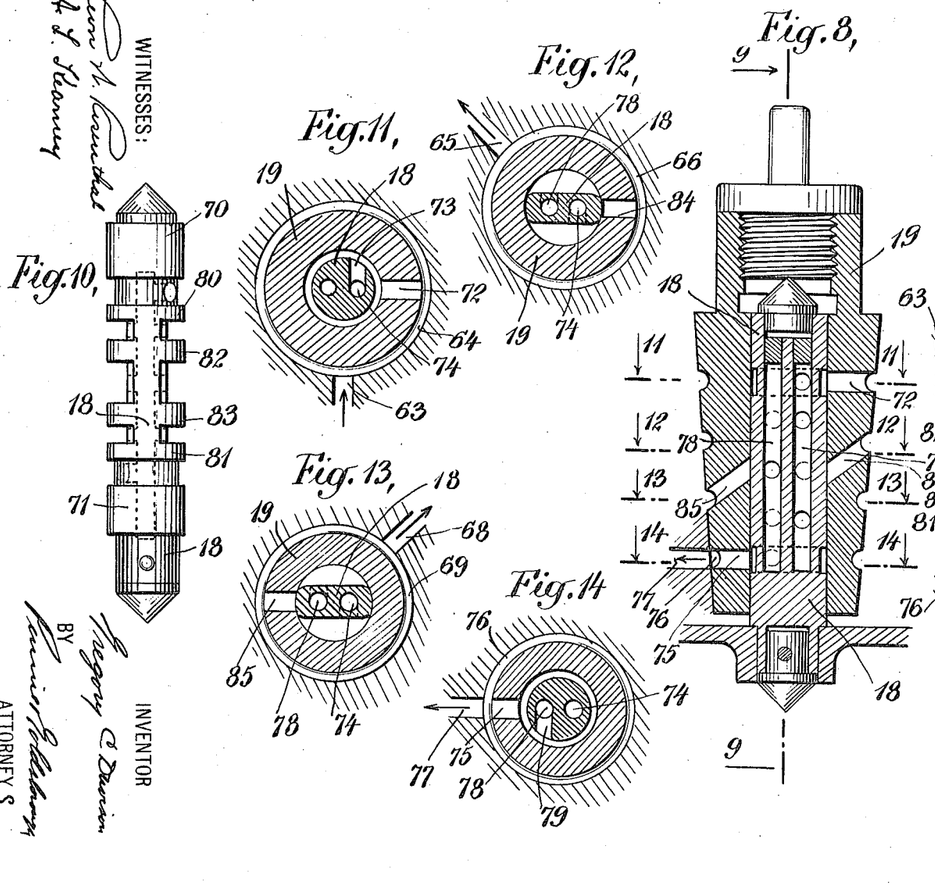

The rotating body of the gyroscope is made up of two spherical segments 1 and 2 bolted together by the bolts 3 and binding between them an annular ring 4 on the periphery of which are the turbine buckets 5, which are so shaped as to reverse the direction of movement of the impacting fluid, and permit its free escape laterally, to utilize the full energy of the fluid. This rotating body is supported on a shaft 6 journaled in ball bearings carried by the onepiece cup and sleeve 7 adjustably mounted in the inner gimbal-ring 8, and provided with the locking nuts 9 to lock the bearings in adjusted position. The inner gimbal-ring is supported by the pivot points 11 in the outer gimbal-ring 12, these pivot points being screwed into a slotted portion of the outer gimbal-ring, as shown in Figs. 7 and 8, the slotted portion being provided with the locking bolts 13 to lock the pivot points in adjusted position. The pivot points project into ball bearings, in the inner gimbal-ring as shown in Fig. 6. The outer gimbal-ring 12 is supported in a bracket 14 which is to be suitably mounted in the body of the torpedo preferably in such position that the axis of the gyroscope extends longitudinally of the torpedo. The outer gimbal-ring is mounted on ball bearings on the projecting arms of the bracket 14, the mounting being such that the two impulse nozzles 15 extend through the bearings so that their axes coincide with the vertical axis of rotation of the outer gimbal-ring. Mounted on the upper portion of the outer gimbal-ring and in the construction shown forming a part of the ball bearing, is a pinion 16 which meshes with a pinion 17 secured to the lower end of the plug 18 of the control valve for the servo-motor. Surrounding this plug, within a conical seat in the bracket 14 is a conical valve sleeve 19 having screwed into its upper end the screw plug 20 terminating in a flattened head and carrying on its lower face a bearing surface of hardened steel for the hardened pointed upper end of the valve plug 18, the hardened pointed lower end of that plug resting on a hardened steel bearing surface 21 in a small bracket 22 supported upon the bracket 14. The conical sleeve 19 is held in place by the plate 23 bolted to the upper surface of the bracket 14, and by loosening this plate and turning the conical valve plug by means of its flattened termination the parts may be so set that the torpedo will not assume immediately the straight line of fire but will first be steered through a course differing by a predetermined angle threfrom. The object of this is to provide for the so-called "wide angle" fire, permitting for example a torpedo fired from the bow or stern of a vessel to proceed in a broadside direction.

Figures 1, 2:
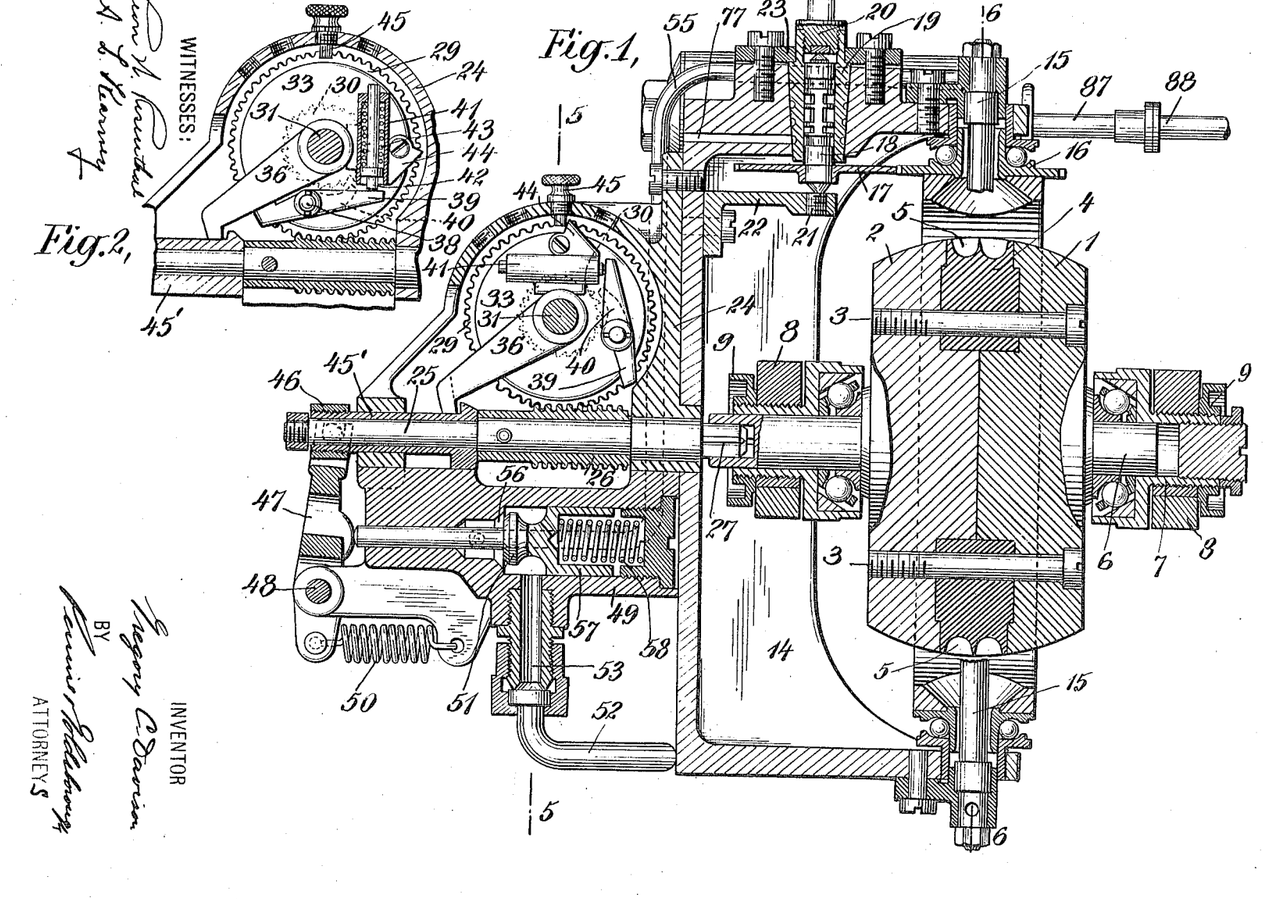
Figure 1 is a central vertical section of the gyroscope and its associated retaining and releasing mechanism and the valve and valve actuating mechanism for the servo-motor.
Fig. 2 is a detail showing a different position of one part of the control mechanism.
Figure 5:
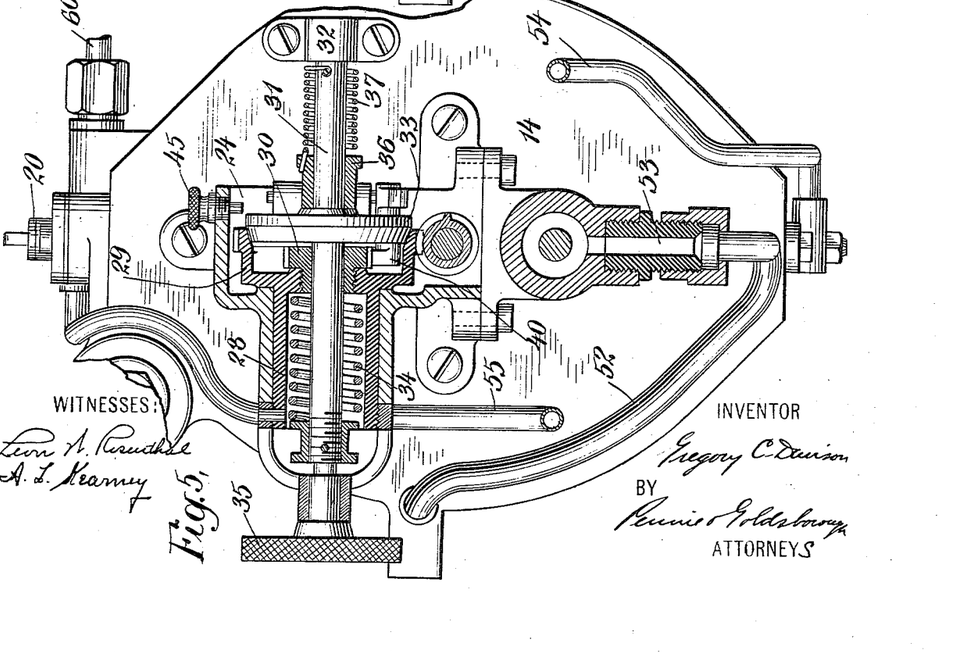
Fig. 5 is a vertical section on the line 5—5 of Figs. 1 and 3.

The mechanism for retaining and releasing the gyroscope is, in the embodiment shown, mounted in a housing 24 bolted to the rear face of the bracket 14. It comprises a rotary shaft 25 carrying a worm 26, and having a squared or feathered end 27 adapted to engage with and be rotated by the shaft 6 of the rotating body of the gyroscope. Within the housing 24, and carried by a rotatable sleeve 28 (see Fig. 5) is a worm wheel 29, which carries coaxially with it a ratchet pinion 30 through the center of which passes a shaft 31 supported at its outer end by the journal bracket 32 and carrying a friction disk 33 adapted to engage the worm wheel 29, and to be forced into the engaging position by a strong spring 34 housed within the sleeve 28. This shaft carries at its outer end a knurled wheel or disk 35 adapted to turn it, and the shaft is so mounted that it may be pressed inwardly against the pressure of spring 34 to disconnect the friction disk from the worm wheel. The shaft also carries rotatably mounted on it the latch arm 36, which is urged into the latching position by the coiled spring 37. Passing through the friction disk 33 is a short shaft or pin 38 carrying at its outer end the releasing finger 39 and at its inner end the pawl 40 adapted to engage the ratchet disk 30. Fastened to the face of the friction disk 33 is a cylindrical housing 41 in which is mounted a pressing pin 42 and a coiled spring 43, the spring being adapted to force the pin against the end of the releasing finger 39, and normally to throw the pawl 40 out of engagement with the ratchet disk 30. The housing 41 also carries a lug 44 arranged to engage the inwardly projecting stop 45 screwed into the housing 24. This stop may be fixed at either one of the four positions indicated on Figs. 1 and 2, for the purpose of varying the length of time during which the impelling fluid acts upon the turbine. If a wider adjustment is desired it is only necessary to provide more holes for this stop. The toe of the latch on 36 is arranged to engage a projection on a sleeve 45' which surrounds the reduced end of the shaft 25 and is guided in the housing 24, as shown in Fig. 1. The projecting end of the sleeve 45' carries a collar 46 with projecting pins engaged by the forked end of an arm 47 pivoted at 48 on the valve casing 49 which also is bolted to the rear face of bracket 14 immediately beneath the housing 24. The arm 47 is provided at its lower end with a spring 50 connected between the arm and the valve casing so as to tend to turn the arm in a direction to move the shaft 25 to the left, as viewed in Fig. 1, and out of engagement with the rotating shaft of the gyroscope. The valve casing 49 contains the valve 51 which controls the flow of fluid to the gyroscope. The fluid is supplied from the storage reservoir on the torpedo through supply pipe 52 and duct 53 to the casing of the valve 51, and is taken from that casing through the pipes 54 and 55, which communicate with the reduced chamber at the extreme left hand end of the valve casing, as shown in dotted lines in Fig. 1, to the two turbine nozzles 15. Between this reduced chamber and the main body of the casing is a valve seat 56 for the valve 51. The valve 51 is carried by a piston 57 which is pressed toward the left by the spring 58, the interior of the piston being put into communication with the forward portion of the valve casing by a small duct as shown in Fig. 1 to equalize the pressure on the two sides of the piston. Projecting from the rear face of valve 51 is a stem which extends through the casing into engagement with arm 47, so that with the parts in the position shown in Fig. 1 the valve is locked open by the latch 36. The operation of these parts is as follows: When the torpedo is to be adjusted for a run a removable plate on the torpedo over the gyroscope is removed. The inner gimbal-ring 8 is grasped by the operator and held in such a position that the socket in the end of the gyroscope shaft 6 is in line with the axis of the retaining shaft 25. In the construction shown the feathers 27 engage corresponding slots in the end of the gyroscope shaft, but any other suitable connection may be employed. With the other hand the operator then turns knurled disk 35 so as to turn the friction disk 33 in a counter-clockwise direction as viewed in Figs. 1 and 2. It will be understood that during the movement of the parts into the releasing position the friction disk 33 will have been rotated in a clockwise direction to and beyond the position shown in Fig. 2. That is, in Fig. 2, the parts are about to be released, and upon release the worm 26 moves to the left, turning the gear wheel 29 and with it the friction disk 33 still farther in a clockwise direction. In resetting the device, therefore, the parts will have to be returned from this position. During the first part of this counter-clockwise rotation of the friction disk the coiled spring 37 connected to the latch arm 36 will press the arm against the end of finger 39 and, against the force of spring 43, will turn pin 38 and throw the pawl 40 into engagement with the teeth of ratchet disk 30. This connection, in addition to the frictional contact, turns the worm wheel 29 with the friction disk and pushes the shaft 25 to the right into engagement with the end of gyroscope shaft 6. When the parts have come to the position shown in Fig. 2, the toe of latch arm 36 drops behind the projection on sleeve 45′ and holds the parts in the retaining position. The knurled disk 35 is then pressed inwardly to release the frictional contact between disk 33 and worm wheel 29, and at the same time the pressure of the arm 36 on finger 39 is relieved so that the spring 43, acting through pin 42 throws the pawl 40 out of engagement with ratchet disk 30. The friction disk is then free to turn farther in a counter-clockwise direction until the lug 44 comes into engagement with stop 45. The sliding of shaft 25 to the right will, in the meantime, have acted upon the projecting stem of valve 51 to force that valve to the open position as shown in Fig. 1.

Figure 3:
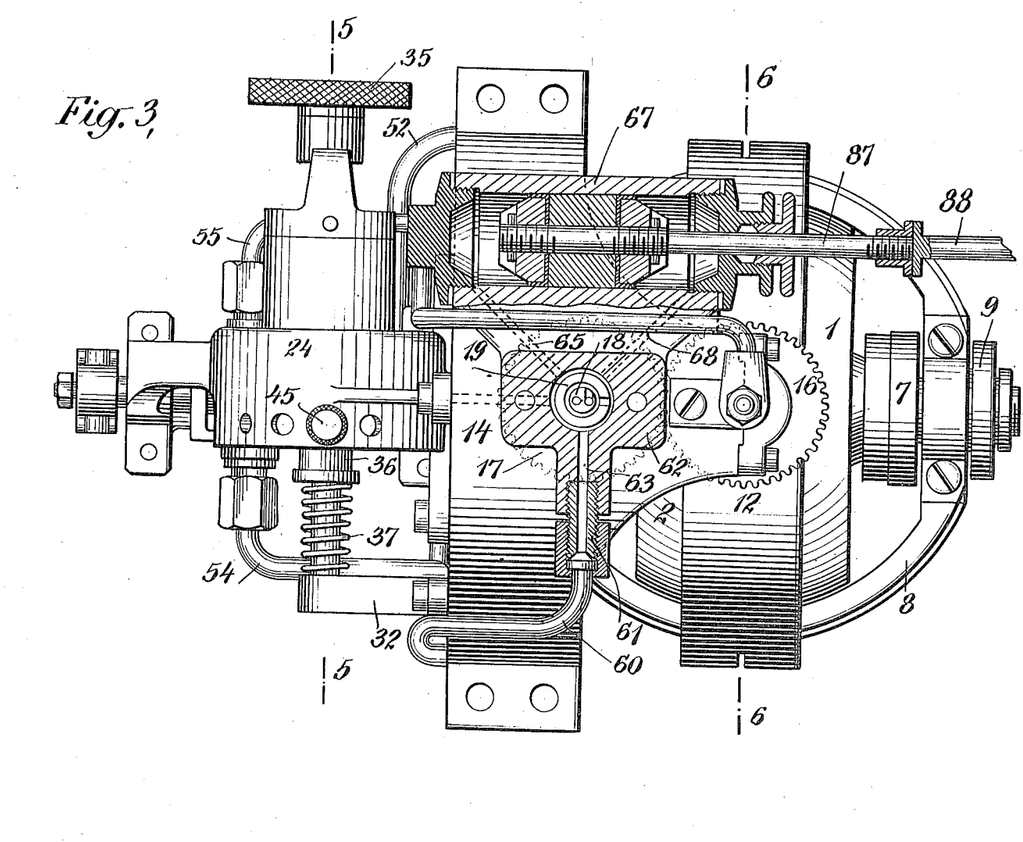
Fig. 3 is a plan view of the parts shown in Fig. 1, the servo-motor and the controlling valve therefor being shown in section.
Figure 9:
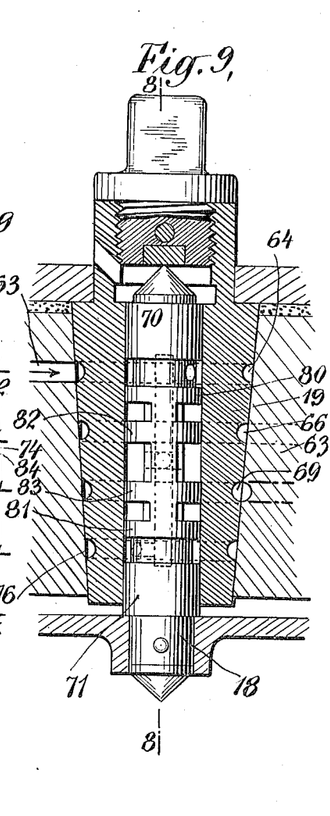
Fig. 9 a section on the line 9—9 of Fig. 8 with the valve plug in elevation.

The supply connections and the construction and arrangement of control valve for the servo-motor, will best be understood from Figs. 3 and 8 to 14, inclusive. The motive fluid for the servo-motor is supplied from the fluid reservoir through a pipe 60 to a nipple 61, projecting from the valve casing 62, and communicating with a duct 63, which communicates with the upper annular duct 64 in the rotary conical valve sleeve 19. From the valve casing the fluid passes through duct 65, which communicates with the annular duct 66, to the forward end of the servo-motor cylinder 67, and the valve casing is in communication with the rear end of the cylinder through duct 68, communicating with the annular groove 69. The valve plug 18 has cylindrical end portions 70 and 71, which fit tightly in the cylindrical bore of sleeve 19. Immediately below the cylinder portion 70, the diameter of the plug is reduced to form an annular duct, and by means of a radial duct 72, (Fig. 11) the chamber formed by this reduced portion and the underlying disk portion 80 of the plug is in communication with the annular duct 64 and so with the source of fluid supply. This chamber is also in communication at all times through the lateral duct 73 in the valve plug with a longitudinal air passage 74, within the body of the plug. Similarly, immediately above the cylindrical portion 71, is a reduced portion forming a like chamber which through the lateral duct 75, is in communication with annular duct 76 on the lower part of sleeve 19, and this annular duct is in communication with the atmosphere through the exhaust passage 77. The chamber formed by this reduced portion of the plug and the overlying disk portion 81, is at all times in communication with the longitudinally extending exhaust passage 78 of the plug through the lateral duct 79. Below disk 80, and above the disk 81, the body of the plug is reduced to flattened portions and is again extended to form the disks 82 and 83, so that the disks 80 and 82 and 81 and 83 inclose two pressure equalizing chambers, which are divided by the flattened portion of the plug into a right-hand chamber and a left-hand chamber, as shown in Fig. 9. The right-hand chamber is in communication with the air duct 74, and the left-hand chamber with the exhaust duct 78, at all times. These chambers take no part in the distribution of the air, but are solely for the purpose of equalizing the pressure on the plug to prevent it from sticking, and they should be made of such size that the sum of the areas exposed in the chambers to the air pressure and to the exhaust pressure are respectively equal and opposite to the exposed areas in the distributing chamber between the disks 82 and 83. This distributing chamber may be put into communication through the inclined duct 84, the annular channel 66, and the duct 65, with the rear end of the servo-motor cylinder and by the inclined duct 85, annular channel 69 and duct 68, with the forward end of the servo-motor cylinder, but when the valve plug 18 is in its central position, as shown in Figs. 12 and 13, it closes both the ducts 84 and 85. The flattened portion of the valve plug between the disks 82 and 83 which divides the distribution chambers into two parts, contains two ducts, as shown in dotted lines in Fig. 12, which extend in opposite directions, one communicating with the air duct 74, and the other with the exhaust duct 78. The result of this construction is, that when the plug is exactly in its central position, communication with the cylinder of the servo-motor is shut off; but when the plug moves to the slightest degree out of the central position in either direction, communication is established with the two ends of the servo-motor cylinder, and its piston is moved in one direction or the other, depending upon the direction in which the valve plug is turned. For example, if the valve plug is turned out of the position shown in the drawings in a clockwise direction, communication is immediately established from the air supply duct 74, through duct 85, channel 69 and duct 68 to the rear end of the servo-motor, and at the same time communication is established through the exhaust duct 78, the duct 84, channel 66, and duct 65, with the forward end of the servo-motor cylinder, so that the piston will move to the left as shown in Fig. 3, and this piston is connected in the usual manner through the piston rod 87 and connecting rod 88, with the rudder controlling mechanism so that the rudders are instantly moved in the proper direction to correct the deviation. By making the flattened portion of the valve plug just thick enough to close the ducts 84 and 85 when the plug is exactly in the central position, the control is extremely delicate, since the slightest move from the central position will instantly establish communication with the cylinder of the servo-motor and actuate the rudders. As a result of this construction, and of the balancing and delicate mounting of the valve plug, together with the arrangement of the actuating-pinion 16, at the pivotal axis of the outer gimbal-ring, the control of the valve is accomplished without any objectionable reaction upon the gyroscope.

Figure 4:
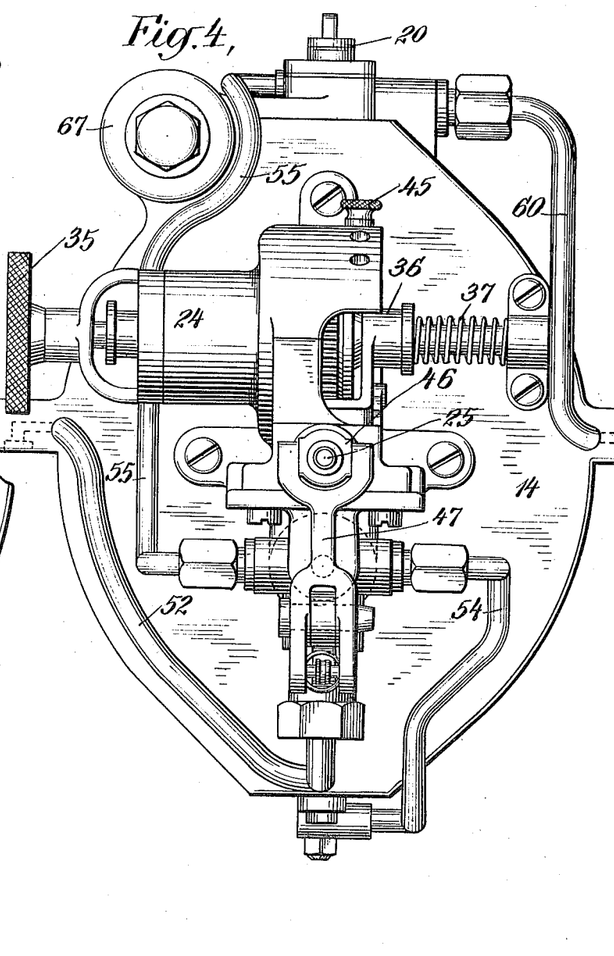
Fig. 4 is an elevation of the retaining and releasing mechanism.

The operation of the apparatus as a whole is as follows: Let it be assumed, that the gyroscope has been set up in the manner above described, and the torpedo has been placed in the firing tube. Immediately upon the starting of the forward movement of the torpedo out of its tube, the control valve of the air supply is automatically opened in the usual way, and the compressed air rushes through the pipe 52, past the valve 51, and through the pipes 54 and 55 to the turbine nozzles, from which it impinges upon the turbine blades and very quickly spins the gyroscope up to the desired speed. The rotation of the gyroscope body turns the worm shaft 25, and with it the worm wheel 29, until the finger 39 engages and lifts the latch arm 36. Thereupon the arm 47 is thrown to the left by the force of springs 50 and 58, and the pressure upon the unbalanced area of the two sides of the valve body 57 having been admitted back of that body through the duct provided for the purpose. This movement of arm 47 will throw shaft 25 to the left, the worm 26 then acting upon the worm wheel as a rack to still further turn the worm wheel in a clockwise direction. This disconnects the gyroscope shaft from the shaft 25, and leaves the gyroscope freely suspended. At the same time, the valve 51 is closed and the supply of air to the turbine nozzles is shut off. If it is intended that the torpedo shall maintain a straight course after it leaves the firing tube, the control valve plug 18 will have been set in such position as to close the ducts 84 and 85, as shown in Figs. 12 and 13. With the valve so placed, any deviation of the torpedo will cause the pinion 16 to turn the pinion 17 and with it the valve plug, and thereby return the torpedo to its proper direction. If it is desired to have the torpedo turn through a certain angle after firing, and before assuming its line of fire, it is only necessary to turn the valve sleeve 19 through the desired angle. It will be observed that the air supply to the servo-motor is through the pipe 60 and the control valve. As a matter of convenience, pipes 60 and 52 are led to connecting sockets in the bracket 14, as shown in Fig. 4, and these sockets are provided with openings to which the connecting pipes may be readily attached.

It will be observed that the restraining mechanism of my invention is driven positively by the gyroscope itself, so that it is always released after a predetermined number of revolutions of the gyroscope, and is never released until the predetermined number of revolutions has been performed. This restraining mechanism controls also the supply of fluid to the nozzles and consequently the supply is never shut off until the gyroscope has performed a given number of revolutions. In other words, the shutting off of the fluid supply is not dependent upon the lapse of any predetermined time period, but is dependent entirely upon the number of revolutions performed by the gyroscope. The result is that unless the pressure of the air supply varies through limits which are not to be anticipated in practice, the gyroscope will always be spun up to substantially the same speed. Furthermore, the proper release of the gyroscope after the spinning operation is assured and it is impossible that, because of the stopping up of any valves or the like which have heretofore been used with such turbine driven gyroscopes, the shutting off of the impulse fluid and the release of the gyroscope should be prevented.

What I claim is:

1. In gyroscopic steering mechanism of the character described, a turbine-driven gyroscope, in combination with a device for restraining the gyroscope during the impulse period, and release mechanism therefor actuated by the gyroscope to release it after a predetermined number of revolutions.

2. In gyroscopic steering mechanism of the character described, a turbine-driven gyroscope, in combination with a device for restraining the gyroscope during the impulse period, and release mechanism therefor actuated by the gyroscope to release it after a predetermined number of revolutions, said mechanism being adjustable to vary the number of revolutions that the gyroscope must perform before it is released.

3. In gyroscopic steering mechanism of the character described, a turbine-driven gyroscope, a valve controlling the supply of fluid to the turbine, and mechanism actuated by the gyroscope to close said valve after a predetermined number of revolutions of the gyroscope.

4. In gyroscopic steering mechanism of the character described, a turbine-driven gyroscope, a valve controlling the supply of fluid to the turbine, and mechanism actuated by the gyroscope to close said valve after a predetermined number of revolutions of the gyroscope, said mechanism being adjustable to vary the number of revolutions that the gyroscope must perform before the fluid is shut off.

5. In gyroscopic steering mechanism of the character described, a turbine-driven gyroscope, in combination with a device for restraining the gyroscope during the impulse period, said device comprising a rotary restraining shaft mounted to be moved longitudinally into engagement with the shaft of the gyroscope, a latch for holding the restraining shaft in such engagement, and mechanism actuated by the rotation of said restraining shaft to release said latch after a predetermined number of revolutions.

6. In gyroscopic steering mechanism of the character described, a turbine-driven gyroscope, a device for restraining the gyroscope during the impulse period, and release mechanism therefor actuated by the gyroscope to release it after a predetermined number of revolutions, in combination with a valve controlling the supply of fluid to the turbine, and connections between the said valve and the restraining device for holding the valve in the open position while the gyroscope is restrained, and permitting the valve to close when the gyroscope is released.

7. The combination with a gyroscope for the purpose described, of restraining mechanism therefor comprising a rotary shaft mounted to be moved longitudinally into engagement with the shaft of the gyroscope, a worm on said shaft, a worm wheel meshing with the worm, a latch for holding the restraining shaft in engagement with the gyroscope shaft, and mechanism actuated by said worm wheel to release said latch.

8. The combination with a gyroscope for the purpose described, of restraining mechanism therefor, comprising a rotary shaft mounted to be moved longitudinally into engagement with the shaft of the gyroscope, a worm on said shaft, a worm wheel meshing with the worm, a latch for holding the restraining shaft in engagement with the gyroscope shaft, a shaft on which the worm wheel is mounted, a support carrying a latch-releasing finger mounted for rotation on said shaft, and connections between the worm wheel and said support whereby the support moves with the worm wheel when the worm wheel is driven by the worm, but the support may be freed from the worm wheel and turned in the reverse direction to reset the releasing mechanism.

9. The combination with a gyroscope for the purpose described, of restraining mechanism therefor comprising a rotary shaft mounted to be moved longitudinally into engagement with the shaft of the gyroscope, a worm on said shaft, a worm wheel meshing with the worm, a latch for holding the restraining shaft in engagement with the gyroscope shaft, a shaft on which the worm wheel is mounted, a support carrying a latch-releasing finger mounted for rotation on said shaft, and connections between the worm wheel and said support whereby the support moves with the worm wheel when the worm wheel is driven by the worm, but the support may be freed from the worm wheel and turned in the reverse direction to reset the releasing mechanism, and an adjustable stop for limiting the extent of the resetting turning movement.

10. The combination with a gyroscope for the purpose described, of restraining mechanism therefor comprising a rotary shaft mounted to be moved longitudinally into engagement with the shaft of the gyroscope, a worm on said shaft, a worm wheel meshing with the worm, a shaft on which said worm wheel is loosely mounted, a latch for holding the restraining shaft in engagement with the shaft of the gyroscope, a friction disk secured to the shaft on which the worm wheel is mounted, and a latch releasing finger carried by said disk, the friction-disk-carrying shaft being longitudinally movable to disengage the friction disk and worm wheel, substantially as and for the purpose described.

11. The combination with a gyroscope for the purpose described, of restraining mechanism therefor comprising a rotary shaft mounted to be moved longitudinally into engagement with the shaft of the gyroscope, a worm on said shaft, a worm-wheel meshing with the worm, a shaft on which said worm wheel is loosely mounted, a ratchet disk carried by the worm wheel concentric with the shaft, a latch for holding the restraining shaft in engagement with the shaft of the gyroscope, a friction disk secured to the shaft on which the worm wheel is mounted, a latch releasing finger pivoted on said disk, a pawl connected to said finger in position to engage said ratchet disk, and a spring normally tending to throw said pawl out of engagement with the disk and being so connected as to oppose the pressure of the releasing finger against the latch, the friction-disk-carrying shaft being longitudinally movable to disengage the friction disk and worm wheel; substantially as and for the purpose described.

12. In a gyroscopic steering mechanism for the purpose described, a fluid operated motor for controlling the steering, a gyroscope, and a support therefor, a valve case containing ducts communicating with the fluid operated motor and a distribution chamber into which said ducts open, a flattened valve plug fitted within said chamber constituting a partition therein, said plug containing a fluid supply duct opening through one face of the flattened portion thereof and an exhaust duct opening through the other face of said flattened portion, said plug being so arranged, and the flattened portion being of such width, that in one position of the plug the two edges of the flattened portion shut off the passages communicating with the fluid operated motor, and connections for causing the relative movement of the gyroscope with respect to its support to impart like relative movement to the valve plug with respect to its casing, whereby such relative movement of the gyroscope with respect to its support immediately establishes supply and exhaust connections with the fluid operated motor and moves the same in one direction or the other, depending upon the direction of such relative movement of the gyroscope and its support.

13. In gyroscopic steering mechanism for the purpose described, a fluid operated motor for controlling the steering, a gyroscope, and a support therefor, a valve case containing ducts communicating with the fluid operated motor and a distribution chamber into which said ducts open, a flattened valve plug fitted within said chamber constituting a partition therein, said plug containing a fluid supply duct opening through one face of the flattened portion thereof and an exhaust duct opening through the other face of said flattened portion, the said flattened portion being of such width, that in one position of the plug the two edges of the flattened portion shut off the passages communicating with the fluid operated motor, connecting passages for subjecting the opposite sides of the valve plug outside of the distribution chamber to the exhaust pressure and the fluid supply pressure in such manner as to balance those pressures within the distribution chamber, and connections for causing the relative movement of the gyroscope with respect to its support to impart like relative movement to the valve plug with respect to its casing, whereby such relative movement of the gyroscope with respect to its support immediately establishes supply and exhaust connections with the fluid operated motor and moves the same in one direction or the other, depending upon the direction of such relative movement of the gyroscope and its support.

14. In a gyroscopic steering mechanism for the purpose described, a fluid operated motor for controlling the steering, a gyroscope, and a support therefor, in combination with a valve casing containing ducts communicating with the fluid operated motor, a valve sleeve fitting said casing, and containing channels arranged to register with said ducts and passages leading from said channels to the interior of the sleeve, a plug fitted within said sleeve and defining a distribution chamber into which said passages lead, said plug having a flattened portion constituting a partition in said chamber and being of such width that in one position its two edges shut off said passages, a fluid supply passage in said plug opening through one face of said flattened portion and an exhaust passage opening through the other face thereof, and connections for causing the relative movement of the gyroscope with respect to its support to impart a like relative movement to the valve plug with respect to the sleeve, whereby a movement of the valve plug out of the passage-closing position immediately establishes fluid supply and exhaust connections with the fluid operated motor and moves the same in one direction or the other, depending upon the direction of movement of the gyroscope with respect to its support, and the said sleeve may be turned to any selected angle to cause the torpedo to move through a corresponding arc before it assumes the predetermined line of fire.

15. In a gyroscopic steering mechanism for the purpose described, a fluid operated motor for controlling the steering, a rotary control valve for said motor, a gyroscope, and a support therefor, in combination with a pinion mounted on the outer gimbal-ring of the gyroscope concentrically with respect to the axis of rotation thereof and a second pinion meshing with the first named pinion and connected to the control valve.

In testimony whereof I affix my signature, in presence of two witnesses.

GREGORY CALDWELL DAVISON.

Witnesses:
L. W. BROGAN,
F. L. BRAKE.